US 11,349,862 B2

(12) United States Patent
Key et al.

(10) Patent No.: US 11,349,862 B2
(45) Date of Patent: May 31, 2022

(54) SYSTEMS AND METHODS FOR TESTING KNOWN BAD DESTINATIONS IN A PRODUCTION NETWORK

(71) Applicant: Mandiant, Inc., Milpitas, VA (US)

(72) Inventors: Christopher B. Key, McLean, VA (US); Paul E. Holzberger, Jr., Mount Crawford, VA (US); Jeff Seely, Danville, CA (US)

(73) Assignee: MANDIANT, INC., Milpitas, CA (US)

( * ) Notice: Subject to any disclaimer, the term of this patent is extended or adjusted under 35 U.S.C. 154(b) by 248 days.

(21) Appl. No.: 16/397,893

(22) Filed: Apr. 29, 2019

(65) Prior Publication Data
US 2020/0280576 A1    Sep. 3, 2020

Related U.S. Application Data
(60) Provisional application No. 62/812,631, filed on Mar. 1, 2019.

(51) Int. Cl.
*H04L 9/40* (2022.01)
(52) U.S. Cl.
CPC ...... *H04L 63/1433* (2013.01); *H04L 63/0263* (2013.01); *H04L 63/0281* (2013.01); *H04L 63/20* (2013.01)
(58) Field of Classification Search
CPC . H04L 63/20; H04L 63/0281; H04L 63/0263; H04L 63/1433
USPC .......................................................... 726/1
See application file for complete search history.

(56) References Cited

U.S. PATENT DOCUMENTS

| | | | | |
|---|---|---|---|---|
| 7,620,985 B1* | 11/2009 | Bush | ........... | H04L 63/1433 726/22 |
| 7,987,264 B1* | 7/2011 | Gill | ........... | H04L 41/0816 709/225 |
| 8,166,533 B2* | 4/2012 | Yuan | ........... | H04L 63/029 726/11 |
| 9,100,324 B2* | 8/2015 | Reeves | ........... | H04L 63/1441 |
| 10,362,048 B2* | 7/2019 | Alexander | ........... | H04L 63/1408 |
| 10,505,899 B1* | 12/2019 | Singh | ........... | H04L 63/0263 |

(Continued)

FOREIGN PATENT DOCUMENTS

WO    WO-2019036717 A1 *    2/2019    ............. H04L 67/34

*Primary Examiner* — Dant B Shaifer Harriman
(74) *Attorney, Agent, or Firm* — Foley & Lardner LLP

(57) ABSTRACT

The disclosure is directed to a system for testing known bad destinations while in a production network. The system can include a source controller and a destination controller in a production network. The source controller and the destination controller can have a configuration of a predetermined set of one or more known bad external destinations to test a security control device of the production network intermediary to the source controller and the destination controller. The source controller can be configured to communicate test traffic generated to a known bad external destination. The test traffic can pass through the security control device with a network identifier of the known bad external destination. The destination controller can be configured to receive the test traffic forwarded by a network device of the production network. The security control device can be validated whether or not the security control device applied security controls on the test traffic using the network identifier of the known bad external destination.

22 Claims, 6 Drawing Sheets

(56) References Cited

U.S. PATENT DOCUMENTS

| | | | |
|---|---|---|---|
| 11,159,416 B1* | 10/2021 | Colwell | H04L 49/55 |
| 2003/0208616 A1* | 11/2003 | Laing | H04L 69/22 |
| | | | 709/236 |
| 2006/0053491 A1* | 3/2006 | Khuti | H04L 63/1416 |
| | | | 726/23 |
| 2006/0095970 A1* | 5/2006 | Rajagopal | H04L 63/1408 |
| | | | 726/25 |
| 2011/0247048 A1* | 10/2011 | Gill | H04L 45/308 |
| | | | 726/1 |
| 2015/0188949 A1* | 7/2015 | Mahaffey | H04W 12/37 |
| | | | 726/1 |
| 2017/0078329 A1* | 3/2017 | Hwang | H04L 63/0263 |
| 2017/0272465 A1* | 9/2017 | Steele | H04L 63/107 |
| 2018/0041471 A1* | 2/2018 | Sudo | H04L 63/1416 |

* cited by examiner

SYSTEMS AND METHODS FOR TESTING KNOWN BAD DESTINATIONS IN A PRODUCTION NETWORK

CROSS-REFERENCE TO RELATED APPLICATION

This patent application claims priority to and the benefit of U.S. Provisional Patent Application No. 62/812,631, titled "SYSTEMS AND METHODS FOR TESTING KNOWN BAD DESTINATIONS IN A PRODUCTION NETWORK," and filed Mar. 1, 2019, the contents of which are hereby incorporated herein by reference in its entirety for all purposes.

FIELD OF DISCLOSURE

The present disclosure is generally directed to various systems and methods for configuring, executing, and managing attack simulations involving known bad destinations in a production network environment.

BACKGROUND

Computer network security infrastructures can be complex. Typically, they include many different components that each play a role in preventing, detecting, or responding to attacks and malicious behaviors. The security posture of an organization is the result of how the organization's people, processes, and technology all respond to a specific malicious behavior. Testing an organizations security posture to identify and correct security flaws can therefore be a complex task.

BRIEF SUMMARY

Aspects and implementations of the present disclosure are generally directed to systems and methods for improving security in a computer network. Organizations such as businesses often maintain large computer networks for storing and accessing electronic information. A network can include many different types of computing devices, such as servers, desktop computers, laptop computers, mobile devices, switches, and routers that are connected to one another according to a network topology. In some implementations, a network topology may be selected to facilitate data transfer between devices in the network and also to secure sensitive information from being accessed by unauthorized users. For example, a network may be divided into various zones, each of which includes computing devices of a particular type. In some implementations, a group of servers may be organized into one zone of a network in which they are positioned in close physical proximity to one another and directly communicatively coupled to one another. Another network zone can include a group of client workstations that are used to request access to data stored on the servers. In general, a network may include any number of such zones.

Each zone of the network can be protected by various computer security mechanisms. For example, one or more devices such as a device such an intrusion prevention system (IPS), an intrusion detection system (IDS), or a firewall may be positioned between communication paths connecting the various network zones to one another or connecting the internal production network to an egress point to an external network, such as the Internet. In addition, a series of routing and switching devices also may be included in the network to interconnect the various network zones, and also to interconnect computing devices within each network zone. As a result, the overall network topology may be very complex.

In some implementations, the security of each computing device in a network may be tested individually. For example, network packets representing malicious behavior may be directed towards one of the computing devices, and the computing device can be monitored to determine whether it responds appropriately, such as by dropping the malicious packets or generating an alarm condition to indicate that the packets may correspond to an attack. Typically, such a test may be run in a laboratory setting, to avoid compromising the computing device under test in case the computing device does not successfully prevent the attack. However, such isolated lab testing scenarios may fail to fully validate the security posture of the more complex production network, even if individual computing devices appear to respond appropriately to malicious network traffic. For example, an attacker may be able to take advantage of misconfigurations that exist in the production setup but are not present in the isolated laboratory testing scenario. Furthermore, laboratory testing typically relies on simply sending a stream of packets intended to replicate malicious behavior to a given computing device. As such, there is no way to test active stateful connections that may be necessary to route through in the production network environment. Therefore, isolated laboratory testing of computing devices cannot be used to determine how a complex network would respond to malicious packets.

Instead of performing isolated laboratory testing of individual computing devices as discussed above, security of a computer network can be improved by testing within a system that is able to evaluate the security posture of an organization's complex production network. In some implementations, at least part of such a system can be included within a production network and configured such that the security posture of the production network can be evaluated without putting the computing devices within the production network at risk. For example, the system can include a planner and a plurality of controllers. The controllers can be deployed within each zone of the production network. In addition, one or more controllers can be deployed outside the production network. Each node can be configured to assume the role of an attacker or a target for malicious network traffic. Simulations of malicious behavior can be performed by the controllers within the production network, and can therefore account for the complexities of the production network, such as stateful connections through switches, routers, and other intermediary devices. Moreover, simulated malicious network traffic can be constrained to take place only between controllers configured for this purpose, so that no clients or servers of the production network are put at risk. The planner can be configured to communicate with each of the controllers to provide instructions for carrying out simulations, and to receive data from the controllers corresponding to the results of the simulations. In some implementations, the planner can analyze the data received from the controllers to provide a more complete analysis of the overall security posture of the production network. The details of various embodiments of the present solution are set forth in the accompanying drawings and the description below.

In some implementations, the system can be configured to allow for testing of overall security posture as it relates to handling network traffic destined for a known bad destination, which may be a destination external to the production network. In this disclosure, the term "bad destination" or "known bad destination" car refer to any computing device that a network administrator wishes to prevent communications with from inside the production network. A known bad destination can be located within the production network, or may be external to the production network. A known bad destination can be identified based on an internet protocol (IP) address, a domain name such as a fully qualified domain name (FQDN) of a website, a MAC address, or any other identifying information. In some implementations, a known bad destination can be any destination within a particular subnetwork or top-level domain. In some other implementations, a known bad destination can refer to a single computing device, or to a subset of ports including a single port on a computing device.

In some implementations, the production network may include one or more security devices configured to prevent or log attempts to communicate with a particular IP address that is known to be malicious, such as an IP address of a server that hosts a malicious website. An administrator of the production network may wish to perform uniform resource locator (URL) classification validation to determine whether users in the production network are able to communicate with a known bad destination outside of the network, or whether the security devices in the production network correctly prevent, classify, and record attempts to communicate with the known bad destination. The administrator may also wish to test one or more security devices configured to implement an artificial intelligence (AI) model or a security technique based on machine learning, correlation, or analytics to determine whether users within the production network are contacting or attempting to contact known bad destinations, and whether the one or more security devices will correctly notify the administrator of such activity.

Throughout this disclosure, the term "simulated attack" and "simulation" are used to indicate an attack that takes place between controllers in a production network, but which does not impact the functionality of the production equipment itself. However, it should be noted that in at least some implementations, a simulated attack between controllers can include actual network traffic that is considered malicious. For example, in a simulated attack, the controllers may exchange actual malware files or commands requesting the performance of actual malicious activity. Thus, it should be understood that the term "simulated attack" as used in this disclosure is intended to encompass behavior that is virtually indistinguishable from an authentic attack, and may in some instances be referred to as the controlled execution of an attack within a production network.

The systems and methods of this disclosure allow for simulated attacks and other simulated malicious behavior, including attempts to contact known bad destinations, that appear to be the same as an actual attack or malicious behavior in order to more fully test the intricacies of the production network. However, one challenge associated with testing the response of a security device in a production network to an attempt to contact a known bad destination is that, should the security device fail to stop the attempt, any data packet destined for the known bad destination may actually reach the known bad destination. For example, a data packet sent to a destination identified by the IP address 5.5.5.5 may actually be routed to that address even if one or more security devices should have prevented it.

This disclosure describes techniques that can make use of dedicated computing devices, sometimes referred to as controllers, that can serve as the source and destination for malicious attacks. However, when testing an attack involving a known bad destination having an address different from one of the dedicated controllers (e.g., a server that hosts a website known to be malicious), it can be difficult to prevent traffic from actually being sent to that destination while also fully testing the ability of security devices in the production network to prevent it. To address this technical challenge, an additional network device can be installed at or near an egress point of the production network. This network device can be configured to alter the destination address of any packet whose destination corresponds to a known bad destination prior to the packet leaving the production network. As a result, even if a security control device elsewhere in the production network fails to stop the packet destined for the known bad destination, the alteration of the packet by the network device can still help to prevent the packet from actually being delivered to the known bad destination.

At least one aspect of this disclosure is directed to a method of testing known bad destinations while in a production network. The method can include establishing, for a source controller and a destination controller in a production network, a configuration of a predetermined set of one or more known bad external destinations to test a security control device of the production network intermediary to the source controller and the destination controller. The method can include communicating, by the source controller, test traffic generated by the source controller directed to a known bad external destination of the one or more known bad external destinations. The test traffic can pass through the security control device with a network identifier of the known bad external destination. The method can include receiving, by the destination controller, the test traffic forwarded by a network device of the production network. The network device can be configured to change a destination network identifier of the test traffic from the network identifier of the known bad external destination to a network identifier of the destination controller before the test traffic egresses from the production network. The security control device can be validated whether or not the security control device applied security controls on the test traffic using the network identifier of the known bad external destination.

In some implementations, the network identifier can include an internet protocol (IP) address or a domain name. In some implementations, the test traffic may not be communicated from the production network to the known bad external destination. In some implementations, the method can include generating, by the source controller, the test traffic using a source network identifier of the source controller and a destination network identifier of the known bad external destination.

In some implementations, the network device can include a proxy device configured with a rule to forward traffic from a network identifier of the source controller to the network address of the destination controller. In some implementations, the rule can be configured to forward traffic to a proxy network identifier and port configured on the destination controller. In some implementations, the method can include testing, by the destination controller, configuration of the rule of the network before an action using a known good destination.

In some implementations, the network device can include an egress device configured with a network address translation (NAT) rule to change a destination network identifier of traffic to the network identifier of the destination controller if the source network identifier of the traffic corresponds to the source controller. In some implementations, the network device can be intermediary to the security control device and the destination controller. In some implementations, the method can include obtaining, by the source controller and the destination controller, the predetermined set of one or more known bad external destinations from one of a packet capture (PCAP) source, a user input, or a system. In some implementations, the security control device can be validated that the security control device applied the security control to the known-bad bad external destination.

At least another aspect of this disclosure is directed to a system for testing known bad destinations while in a production network. The system can include a source controller and a destination controller in a production network. The source controller and the destination controller can have a configuration of a predetermined set of one or more known bad external destinations to test a security control device of the production network intermediary to the source controller and the destination controller. The source controller can be configured to communicate test traffic generated by the source controller directed to a known bad external destination of the one or more known bad external destinations. The test traffic can pass through the security control device with a network identifier of the known bad external destination. The destination controller can be configured to receive the test traffic forwarded by a network device of the production network. The network device can be configured to change a destination network identifier of the test traffic from the network identifier of the known bad external destination to a network identifier of the destination controller before the test traffic egresses from the production network. The security control device can be validated whether or not the security control device applied security controls on the test traffic using the network identifier of the known bad external destination.

In some implementations, the network identifier can include an internet protocol (IP) address or a domain name. In some implementations, the test traffic may not be communicated from the production network to the known bad external destination. In some implementations, the source controller can generate the test traffic using a source network identifier of the source controller and a destination network identifier of the known bad external destination.

In some implementations, the network device can include a proxy device configured with a rule to forward traffic from a network identifier of the source controller to the network identifier of the destination controller. In some implementations, the rule can be configured to forward traffic to a proxy network identifier and port configured on the destination controller. In some implementations, the destination controller can be configured to test configuration of the rule of the network before an action using a known good destination.

In some implementations, the network device can include an egress device configured with a network address translation (NAT) rule to change a destination network identifier of traffic to the network identifier of the destination controller if the source network identifier of the traffic corresponds to the source controller. In some implementations, the network device can be intermediary to the security control device and the destination controller. In some implementations, the source controller and the destination controller can be configured to obtain the predetermined set of one or more known bad external destinations from one of a packet capture (PCAP) source, a user input, or a system. In some implementations, the security control device can be validated that the security control device applied the security control to the known-bad bad external destination.

BRIEF DESCRIPTION OF THE FIGURES

The foregoing and other objects, aspects, features, and advantages of the disclosure will become more apparent and better understood by referring to the following description taken in conjunction with the accompanying drawings, in which.

Figure 1A:
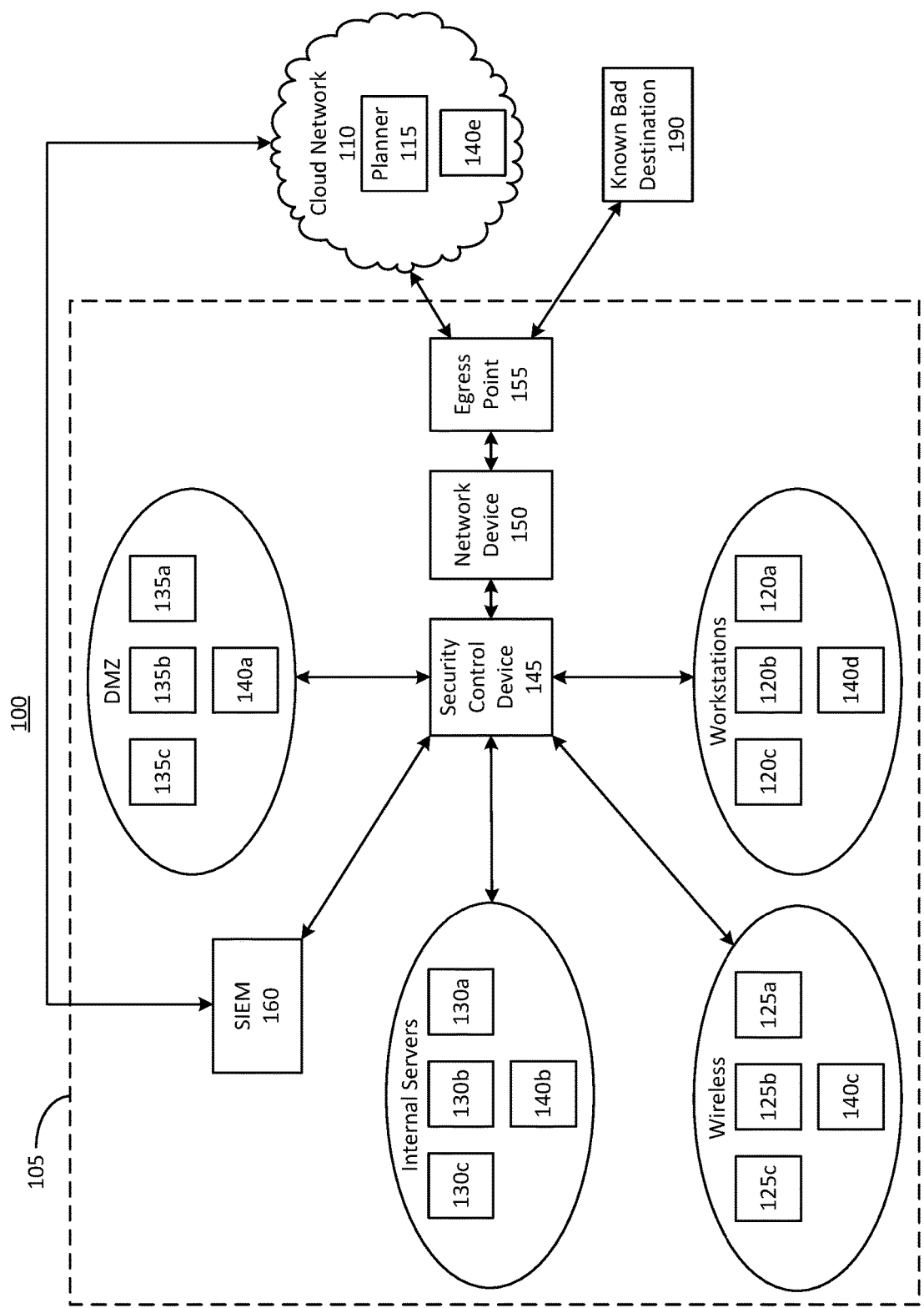
FIG. 1A shows a block diagram of an example system for improving network security.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Aspects and implementations of the present disclosure are generally directed to systems and methods for improving security in a computer network. Organizations such as businesses often maintain large computer networks for storing and accessing electronic information. A network can include many different types of computing devices, such as servers, desktop computers, laptop computers, mobile devices, switches, and routers that are connected to one another according to a network topology. In some implementations, a network topology may be selected to facilitate data transfer between devices in the network and also to secure sensitive information from being accessed by unauthorized users. For example, a network may be divided into various zones, each of which includes computing devices of a particular type. In some implementations, a group of servers may be organized into one zone of a network in which they are positioned in close physical proximity to one another and directly communicatively coupled to one another. Another network zone can include a group of client workstations that are used to request access to data stored on the servers. In general, a network may include any number of such zones.

Each zone of the network can be protected by various computer security mechanisms. For example, one or more devices such as a device such an intrusion prevention system (IPS), an intrusion detection system (IDS), or a firewall may be positioned between communication paths connecting the various network zones to one another or connecting the internal production network to an egress point to an external network, such as the Internet. In addition, a series of routing and switching devices also may be included in the network to interconnect the various network zones, and also to interconnect computing devices within each network zone. As a result, the overall network topology may be very complex.

In some implementations, the security of each computing device in a network may be tested individually. For example, network packets representing malicious behavior may be directed towards one of the computing devices, and the computing device can be monitored to determine whether it responds appropriately, such as by dropping the malicious packets or generating an alarm condition to indicate that the packets may correspond to an attack. Typically, such a test may be run in a laboratory setting, to avoid compromising the computing device under test in case the computing device does not successfully prevent the attack. However, such isolated lab testing scenarios may fail to fully validate the security posture of the more complex production network, even if individual computing devices appear to respond appropriately to malicious network traffic. For example, an attacker may be able to take advantage of misconfigurations that exist in the production setup but are not present in the isolated laboratory testing scenario. Furthermore, laboratory testing typically relies on simply sending a stream of packets intended to replicate malicious behavior to a given computing device. As such, there is no way to test active stateful connections that may be necessary to route through in the production network environment. Therefore, isolated laboratory testing of computing devices cannot be used to determine how a complex network would respond to malicious packets.

Instead of performing isolated laboratory testing of individual computing devices as discussed above, security of a computer network can be improved by testing within a system that is able to evaluate the security posture of an organization's complex production network. In some implementations, at least part of such a system can be included within a production network and configured such that the security posture of the production network can be evaluated without putting the computing devices within the production network at risk. For example, the system can include a planner and a plurality of controllers. The controllers can be deployed within each zone of the production network. In addition, one or more controllers can be deployed outside the production network. Each node can be configured to assume the role of an attacker or a target for malicious network traffic. Simulations of malicious behavior can be performed by the controllers within the production network, and can therefore account for the complexities of the production network, such as stateful connections through switches, routers, and other intermediary devices. Moreover, simulated malicious network traffic can be constrained to take place only between controllers configured for this purpose, so that no clients or servers of the production network are put at risk. The planner can be configured to communicate with each of the controllers to provide instructions for carrying out simulations, and to receive data from the controllers corresponding to the results of the simulations. In some implementations, the planner can analyze the data received from the controllers to provide a more complete analysis of the overall security posture of the production network. The details of various embodiments of the present solution are set forth in the accompanying drawings and the description below.

In some implementations, the system can be configured to allow for testing of overall security posture as it relates to handling network traffic destined for a known bad destination, which may be a destination external to the production network. In this disclosure, the term "bad destination" or "known bad destination" car refer to any computing device that a network administrator wishes to prevent communications with from inside the production network. A known bad destination can be located within the production network, or may be external to the production network. A known bad destination can be identified based on an internet protocol (IP) address, a domain name such as a fully qualified domain name (FQDN) of a website, a MAC address, or any other identifying information. In some implementations, a known bad destination can be any destination within a particular subnetwork or top-level domain. In some other implementations, a known bad destination can refer to a single computing device, or to a subset of ports including a single port on a computing device.

In some implementations, the production network may include one or more security devices configured to prevent or log attempts to communicate with a particular IP address that is known to be malicious, such as an IP address of a server that hosts a malicious website. An administrator of the production network may wish to perform uniform resource locator (URL) classification validation to determine whether users in the production network are able to communicate with a known bad destination outside of the network, or whether the security devices in the production network correctly prevent, classify, and record attempts to communicate with the known bad destination. The administrator may also wish to test one or more security devices configured to implement an artificial intelligence (AI) model or a security technique based on machine learning, correlation, or analytics to determine whether users within the production network are contacting or attempting to contact known bad destinations, and whether the one or more security devices will correctly notify the administrator of such activity.

Throughout this disclosure, the term "simulated attack" and "simulation" are used to indicate an attack that takes place between controllers in a production network, but which does not impact the functionality of the production equipment itself. However, it should be noted that in at least some implementations, a simulated attack between controllers can include actual network traffic that is considered malicious. For example, in a simulated attack, the controllers may exchange actual malware files or commands requesting the performance of actual malicious activity. Thus, it should be understood that the term "simulated attack" as used in this disclosure is intended to encompass behavior that is virtually indistinguishable from an authentic attack, and may in some instances be referred to as the controlled execution of an attack within a production network.

The systems and methods of this disclosure allow for simulated attacks and other simulated malicious behavior, including attempts to contact known bad destinations, that appear to be the same as an actual attack or malicious behavior in order to more fully test the intricacies of the production network. However, one challenge associated with testing the response of a security device in a production network to an attempt to contact a known bad destination is that, should the security device fail to stop the attempt, any data packet destined for the known bad destination may actually reach the known bad destination. For example, a data packet sent to a destination identified by the IP address 5.5.5.5 may actually be routed to that address even if one or more security devices should have prevented it.

This disclosure describes techniques that can make use of dedicated computing devices, sometimes referred to as controllers, that can serve as the source and destination for malicious attacks. However, when testing an attack involving a known bad destination having an address different from one of the dedicated controllers (e.g., a server that hosts a website known to be malicious), it can be difficult to prevent traffic from actually being sent to that destination while also fully testing the ability of security devices in the production network to prevent it. To address this technical challenge, an additional network device can be installed at or near an egress point of the production network. This network device can be configured to alter a network identifier corresponding to the destination address of any packet whose destination is a known bad destination prior to the packet leaving the production network. As a result, even if a security control device elsewhere in the production network fails to stop the packet destined for the known bad destination, the alteration of the packet by the network device can still help to prevent the packet from actually being delivered to the known bad destination.

FIG. 1A shows a block diagram of an example system 100 for improving network security. The system 100 includes an internal enterprise network 105, shown within broken lines, as well as an external cloud network 110 and an external known bad destination 190. The enterprise network 105 can also be referred to as a production network 105. In some implementations, the enterprise network 105 can be a network maintained by an organization, such as a business or government entity, for storing and accessing electronic information and for facilitating electronic communication among members of the organization. The known bad destination 190 can be any computing device or set of computing devices that is known be malicious or with which communications should not occur from within the enterprise network 105. For example, the known bad destination 190 can be one or more servers that host a known malicious website. The known bad destination 190 can be identified, for example, by one or more IP addresses or URLs.

The cloud network includes a planner 115 and a controller 140e. The enterprise network 105 includes several computing devices grouped into several different zones. For example, a "workstations" zone includes several workstations 120a-120c, a "wireless" zone includes several wireless devices 125a-125c, an "internal servers" zone includes several servers 130a-130c, and a "demilitarized zone" (also referred to as a "DMZ zone") that includes several computing devices 135-135c. Each of the network zones in the enterprise network 105 also includes a respective one of the controllers 140a-140d. The computing devices in the various zones of the enterprise network 105 are communicatively coupled to one another, and to the external cloud network 110, through a security control device 145.

The security control device 145 can implement various network security mechanisms, and can be positioned along the communication paths between the network zones of the enterprise network 105. For example, the security control device 145 can be or can include one or more firewall devices, one or more intrusion protection systems (IPSs), or other types of network security devices. In some implementations, the security control device 145 can also include routing functionality. For example, the security control device 145 can be or can include one or more routers or bridges configured to implement the functionality of a firewall, IPS, or other security device. A security information and event management (STEM) device 160 is included within the enterprise network 105 and communicatively coupled to the cloud network 110. The SIEM device 160 also can be communicatively coupled to the security control device 145 to receive security related information from the security control device 145.

The enterprise network 105 also includes a network device 150 and an egress point 155. The network device 150 and the egress point 155 can each be any type of computing device configured to process packets, such as by routing packets to their destinations, implementing network address translation (NAT) rules, or serving as a proxy. In some implementations, the network device 150 and the egress point 155 can be implemented as a single device that performs the functionality of both devices. Generally, the network device 150 and the egress point 155 receive packets from other zones of the network, such as the workstations 120, the wireless devices 125, the internal servers 130, and the DMZ computing devices 135, after such packets have passed through the security control device 145 and before the packets have exited the enterprise network 105. Thus, packets originating from any of the workstations 120, the wireless devices 125, the internal servers 130, and the DMZ computing devices 135 generally must pass through the security control device 145, the network device 150, and the egress point 155 before leaving the enterprise network 105.

The system 100 can be configured to facilitate comprehensive evaluation of the security posture of the enterprise network 105. In some implementations, testing of the security posture of the enterprise network 105 can be carried out by the planner 115 and the controllers 140. Because some of the controllers 140 are positioned within the enterprise network 105, the tests performed by the controllers 140 can accurately reflect the complexity of the enterprise network 105 better than isolated laboratory testing of individual components taken out of the network topology. Furthermore, because tests do not rely on communications between the production computing devices in each network zone (i.e., the computing devices 135 in the DMZ zone, the servers 130 in the internal server zone, the wireless devices 125 in the wireless zone, and the workstations 120 in the workstation zone), the production computing devices are never put at risk during testing.

In some implementations, the controllers 140 serve only to test the security of the enterprise network 105. That is, the controllers 140 may not be used for typical day-to-day operations of the enterprise network 105. For example, although the controller 140d is positioned within the workstation zone along with the workstations 120a-120d, the controller 140d itself may not serve as a workstation during normal operating activities. Rather, the controller 140d is positioned within the workstation group for the purpose of testing how the enterprise network 105 would respond to malicious behavior involving a workstation 120 without actually putting any of the workstations 120 at risk. Likewise, the controller 140c is positioned within the wireless group, but may not be a production wireless device like the wireless devices 125, the controller 140b may not be an internal server like the internal servers 130, and the controller 140a may not be a computing device that serves the same purpose as the computing devices 135. Instead, the controllers 140a-140d may serve only to test the expected response behavior of devices in their respective zones, or of the security control device 145, when sending or receiving malicious network traffic. The controllers 140 can assume the roles of attacker and target during a simulation of malicious behavior, so that the security posture of the enterprise network 105 can be evaluated without putting the other devices in the enterprise network 105 at risk.

In some implementations, the planner 115 can manage the controllers 140 in order to facilitate the execution of simulated attacks by the controllers 140. For example, the planner 115 can send to the controllers 140 instructions regarding specific simulated malicious behaviors that the controllers 140 are to execute. The planner 115 also can receive from the controllers 140 information corresponding to the results of simulations. Generally, management data between the planner 115 and the controllers 140 can include initial registration of each of the controllers 140 with the planner 115, configuration instructions sent to the controllers 140, simulation execution instructions sent to the controllers 140, status updates, and simulation result data. Management data is discussed in greater detail below. In some implementations, the planner 115 can communicate with each of the controllers 140 via an encrypted channel. For example, each controller 140 can include a dedicated channel (e.g., a dedicated IP interface) to the planner 115.

In general, a simulation can include data exchanged between two controllers 140 that is intended to replicate the network traffic that would be seen in the event of an attack or other form of malicious behavior. Because there are controllers 140 positioned within each zone of the enterprise network 105, the traffic patterns (i.e., requests and responses between controllers 140 or other devices) of such simulations can be identical to the traffic patterns that would be observed during an actual attack. In some implementations, the data exchanged between two controllers 140 during a simulation can emulate data that would be sent during an actual attack. In one example, the planner 115 can send instructions to two of the controllers, such as the controller 140a in the DMZ zone and the controller 140d in the workstations zone, to execute a particular simulation. The planner can instruct either of the two controllers 140a and 140d to act as the attacker, and the other to act as the target. Each controller 140a and 140d can receive from the planner 115 information corresponding to the network traffic it should send to the other controller 140a or 140d, as well as information corresponding to the responses it should expect from the other controller 140a or 140d. The two controllers 140a and 140d can then create connections between one another, which may be stateful connections through the security control device 145, for example. Simulation data can then be transmitted between the controllers 140a and 140d according to the simulation instructions they received from the planner 115. During the simulation, each of the controllers 140a and 140d can compare the responses it receives to the responses it expects to receive. For example, in some implementations, the expected response may differ from the actual response in implementations in which the security control device 145 drops or redirects certain packets after determining that the network traffic associated with the simulation may be malicious. In some implementations, the controllers 140a and 140d may then report the results of the simulation to the planner 115. In some implementations, the security mechanisms within the enterprise network 105, such as the security control device 145, can report information to the STEM device 160, which in turn can report this information to the planner 115. The planner 115 can then aggregate and analyze the data it receives from the controllers 140a and 140d and the SIEM device 160 to determine whether the simulated attack was successfully prevented or detected by the security control device 145.

In some implementations, the system 100 can be used to test the response of the enterprise network 105 to attempts to send packets to a known bad destination, such as the known bad destination 190. This example can differ from the example described above in that the controller that initiates the packets (e.g., one of the controllers 140a-140d located within the enterprise network 105) may actually attempt to send one or more data packets to the known bad destination 190 rather than to another one of the controllers 140. As a result, this example simulation can present increased risk because it may be dangerous if the data packets transmitted in the simulation actually reach the known bad destination 190. For example, such a simulation may be designed to validate whether the security control device 145 correctly detects, prevents, or reports an attempt to access the known bad destination 190 from within the enterprise network 105. However, if the security control device 145 fails to prevent the attempt, then the simulation may actually cause data packets to be transmitted to the known bad destination 190.

To address this technical challenge, configuration changes can be made to either or both of the network device 150 or the egress point 155 to allow a simulation to be run with packets addressed to the known bad destination 190, while still ensuring that those packets will not actually arrive at the known bad destination 190 even if the security control device 145 fails to intercept them. For example, the network device 150 or the egress point 155, or both, can be configured to implement a proxy service. In some implementations, the network device 150 itself can be a proxy. The proxy implemented by the network device 150 or the egress point 155 can be support source-based proxy chaining and can be configured with a rule that automatically forwards all network traffic from a controller 140 within the enterprise network 105 to the controller 140e located in the cloud network 110. For example, the rule could be used to forward any network packet having an IP address and port that corresponds to one of the controllers 140 in the enterprise network 105 to an IP address of the controller 140e in the cloud network 110.

During a simulated attack in which one of the controllers 140 in the enterprise network 105 attempts to send a data packet with having a network identifier that corresponds to a destination address of the known bad destination 190, the proxy rule would instead cause the packet to be routed to the controller 140e so that the packet would not reach the known bad destination 190 even if the security control device 145 fails to identify or prevent the packet from being sent. In some implementations, the controller 140e also could be configured to serve as a proxy. For example, the planner 115 could be used to configure the controller 140e to act as a proxy for such a simulation. In some implementations, the controller 140e could be configured to dynamically reconfigure its proxy configuration to forward traffic from its listening proxy port to the appropriate TCP or UDP port needed for execution of the test.

Assuming that the proxy rule is correctly configured, packets destined for the known bad destination 190 as part of an attack simulation would be diverted to the controller 140e instead. However, there may still be a risk that the packets will be delivered to the known bad destination 190 if the proxy rule described above is configured improperly. For example, if the proxy rule incorrectly identifies the source address of one of the controllers 140 in the enterprise network 105, packets sent from that controller 140 may not be properly redirected to the controller 140e as part of the simulated attack. There may be a similar result if the proxy rule incorrectly identifies the destination address of the controller 140e to which packets should be rerouted. To address this technical challenge, the planner 115 can be configured to test the proxy rule. For example, the planner 115 can instruct each of the controllers 140 in the enterprise network 105 to send a data packet to a benign address, such as a URL of a website on a "whitelist" of approved destinations. Then, the planner 115 can check to determine whether the controller 140e receives each of the data packets sent by the controllers 140 inside the enterprise network 105 as part of the proxy rule test.

If the controller 140e receives all of the data packets, the planner 115 can determine that the proxy rule is correctly configured in the enterprise network 105. However, if one or more of the data packets is not received by the controller 140*e*, the planner 115 can determine that the proxy rule is improperly configured with respect to the controller(s) whose network packets are not received by the controller 140*e*. In some implementations, the planner 115 can also be configured to notify an administrator of the enterprise network 105 in the event that the proxy rule is improperly configured. In some implementations, the planner 115 can also be configured to automatically correct an improperly configured proxy rule by communicating directly with either the network device 150 or the egress point 155.

In some implementations, the enterprise network 105 may implement network address translation (NAT) rather than a proxy service to ensure that packets addressed to the known bad destination 190 as part of an attack simulation are not actually delivered to the known bad destination 190. For example, the network device 150, the egress point 155, or both, can be configured with a NAT rule. The NAT rule can be configured to translate the destination address of a packet to an address associated with the controller 140*e*, based on the packet having a source address that corresponds to any of the controllers 140 within the enterprise network 105. In this example, during a simulated attack in which one of the controllers 140 in the enterprise network 105 attempts to send a data packet with a destination address corresponding to the known bad destination 190, the packet having the known bad destination address can pass through the security control device 145 to validate whether the security control device 145 correctly identifies, prevents, or records the attempt to communicate with the known bad destination 190. However, even if the security control device 145 does not intercept or drop the packet, the NAT rule would cause the packet to be routed to the controller 140*e* so that it would not reach the known bad destination 190.

In some implementations, there may still be a risk that the packets will be delivered to the known bad destination 190 if the NAT rule described above is configured improperly. For example, if the NAT rule incorrectly identifies the source address of one of the controllers 140 in the enterprise network 105, packets sent from that controller 140 may not have their destination addresses translated to that of the controller 140*e* as part of the simulated attack, and may therefore be delivered to the known bad destination 190. There may be a similar result if the NAT rule incorrectly identifies the destination address of the controller 140*e* to which packets should be rerouted. To address this technical challenge, the planner 115 can be configured to test the NAT rule. For example, the planner 115 can instruct each of the controllers 140 in the enterprise network 105 to send a data packet to a benign address, such as a URL of a website on a "whitelist" of approved destinations. Then, the planner 115 can check to determine whether the controller 140*e* receives each of the data packets sent by the controllers 140 inside the enterprise network 105 as part of the NAT rule test.

If the controller 140*e* receives all of the data packets, the planner 115 can determine that the NAT rule is correctly configured in the enterprise network 105. However, if one or more of the data packets is not received by the controller 140*e*, the planner 115 can determine that the NAT rule is improperly configured with respect to the controller(s) whose network packets are not received by the controller 140*e*. In some implementations, the planner 115 can also be configured to notify an administrator of the enterprise network 105 in the event that the NAT rule is improperly configured. In some implementations, the planner 115 can also be configured to automatically correct an improperly configured NAT rule by communicating directly with either the network device 150 or the egress point 155.

It should be understood that the above description presents only a few non-limiting examples of simulated attacks, and many other simulations may be run in a similar manner. For example, in some implementations, any one of the controllers 140*a*-140*e* can act as a target, and any other of the controllers 140*a*-140*e* can act as the attacker for another simulation. Thus, because the system 100 includes the controller 140*e* that is external to the enterprise network 110, simulations can be run to emulate an attack originating from outside of the enterprise network 110, such as an attack originating from the known bad destination 190. For example, the controller 140*e* can be designated to serve as the attacker during a simulation, and can modify data packets sent to the enterprise network 105 to appear as if they originated from the known bad destination 190. The path through the enterprise network (and therefore the security control device 145 or other security mechanisms in the enterprise network) that are tested can be determined based on the topology of the enterprise network 105 and the location of the attacker and target controllers 140. In some implementations, the planner 115 can store information about the topology of the enterprise network 105, including information corresponding to which controllers 140 are reachable from other controllers 140 or from outside of the enterprise network 105. The planner 115 can use this information to ensure that simulations are only performed between controllers 140 that are positioned within zones that are actually reachable from one another, so that time and resources are not spent on simulating attacks that would not be possible to carry out.

It should be understood that, while the planner 115 is shown as located within the external cloud network 115, in some implementations the planner 115 can instead be located within the enterprise network 105. Furthermore, while the planner 115 and the controller 140*e* are shown as two separate entities within the cloud network 110, in some implementations a single computing device may be used to implement the functionality of both the planner 115 and the controller 140*e*. In implementations in which the planner 115 is instead located within the enterprise network 110, the functionality of the planner 115 and at least one of the controllers 140*a*-140*d* in the enterprise network may be implemented by a single computing device. For example, the planner 115 can be positioned within the DMZ zone, and the functionality of the planner 115 and the controller 140*a* within that zone can be implemented by a single computing device.

Figure 1B:
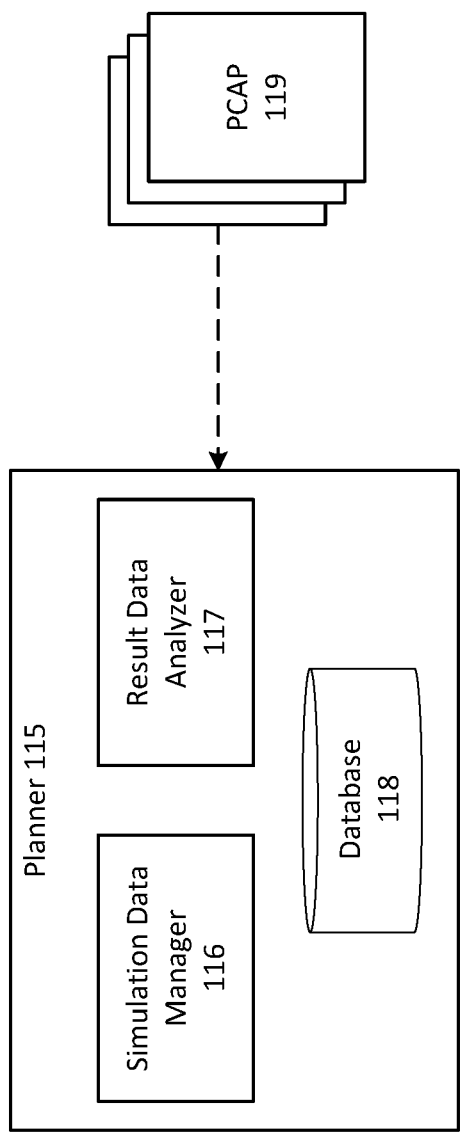
FIG. 1B shows a block diagram of an example planner included in the system network of FIG. 1A.

FIG. 1B shows a block diagram of an example planner 115 included in the example system of FIG. 1A. The planner 115 includes a simulation data manager 116, a result data manager 117, and a database 118. Also shown in FIG. 1B is a plurality of packet capture (PCAP) files 119, which can be received by the planner 115.

As discussed above, the planner 115 can serve to manage the execution of simulated attacks that take place between the controllers 140 shown in FIG. 1A. As shown in FIG. 1A, the planner 115 can be a centralized computing device that exists in an external cloud network, such as the internet. In some other implementations, the planner 115 can be deployed within the enterprise network 105 and maintained by the organization that maintains the enterprise network 105.

The simulation data manager 116 can be configured to handle the transmission and receipt of data related to attack simulations. For example, in some implementations, the simulation data manager 116 can send and receive information related to initial registration of each controller 140, configuration of each controller 140, simulation execution instructions, and simulation results. Initial registration can be any process that pairs each of the controllers 140 with the planner 115. In some implementations, a private key exchange can take place between each controller 140 and the planner 115, which can help to ensure that no other computing devices can impersonate one of the controllers 140, which could compromise the security of the enterprise network 105 in which the controllers 140 are deployed.

The simulation data manager 116 also can generate and transmit to the controllers 140 simulation execution instructions. Generally, simulation execution instructions include any information necessary for the controllers 140 to carry out a simulated attack. For example, simulation instructions can include a collection of all of the requests that each controller 140 should make during a simulation, as well as all of the responses that each controller 140 should receive during the simulation. In some implementations, simulation execution instructions can be based on an actual attack that has been carried out in the past and that could potentially pose a threat to the enterprise network 105. In some implementations, the simulation data manager 116 can generate instructions for such a simulation based on PCAP files corresponding to the actual attack. For example, the PCAP files 119 can be received by the planner 115 and stored in the database 118. The simulation data manager 116 can retrieve a PCAP file 119 from the database 118 and can process the PCAP file 119 to generate simulation instructions that will cause the controllers 140 to send network traffic to replicate the attack. In some implementations, the simulation data manager 116 can analyze the PCAP file 119 to extract the application-layer record of requests and responses exchanged between the attacker and the target. In one example, a PCAP file 119 may correspond to an attack in which an attacker receives an HTTP GET request from a target, and subsequently redirects the request to an end server which causes a piece of malware to be installed on the target device. The PCAP file 119 will typically contain low-level packet information related to data exchanged during the attack. However, the simulation data manager 116 can process the PCAP file 119 to extract the higher-level application layer record of each HTTP request and response, including the content of the actual malware file, to create a set of instructions for the controllers 140 so that the controllers 140 can accurately replicate the attack within the enterprise network 105.

In some implementations, the simulation data manager 116 can be configured to process a PCAP file by first identifying each host conversation within the PCAP file. For example, the simulation data manager 116 can make this determination based on the communication protocol exhibited in the PCAP file. The simulation data manager 116 also can determine the type of application traffic represented by the PCAP file, such as HTTP traffic that may be sent using TCP, or DNS traffic that may be sent using UDP. In some implementations, the determination of the type of application traffic represented by the PCAP file can be made based on the use of application signatures in the PCAP file.

The simulation data manager 116 can be configured to extract higher level (e.g., application level) data from each conversation present in the PCAP file. In some implementations, this extraction can be performed based on the type of application data within each conversation. The simulation data manager 116 can save the higher level data in the database 118. In some implementations, the simulation data manager 116 also can generate metadata to be included in the simulation instructions. Metadata generated by the simulation data manager 116 can be associated with the higher level data. For example, metadata can include the communication protocols in use and, in instances in which the protocol is TCP or UDP, a list of the significant ports used during the conversation.

The simulation data manager 116 can then assign roles to each higher level request and response extracted from the PCAP files based on the type of application that created the original conversation represented in the PCAP file. It should be understood that, in some implementations, the simulation data manager can receive information from sources other than the PCAP files 119. For example, a user such as a network administrator of the enterprise network 105 may manually input information, including one or more known bad destinations to be tested. In some implementations, such information may instead be received at the planner 115 from another system. In some implementations, the roles assigned by the simulation data manager 116 may be generic roles such as "attacker" and "target," or "client" and "server." In some other implementations, the roles assigned by the simulation data manager 116 may be more specific, such as "DNS server." Metadata provided to the controllers 140 can help the controllers 140 to determine whether the responses they receive are similar to the expected responses, so that the controllers 140 can determine whether the attack was successfully replicated or whether security mechanisms within the network 105 intervened to stop the attack. Metadata also can provide additional details on how each controller should make the requests associated with the simulation. In some implementations, the simulation data manager 116 can generate metadata including how many separate sockets or connections should be used when simulating an attack, which IP protocols and significant ports should be used, what type of application data should be used in each connection, whether the data is a valid representation of the leveraged application or protocol, and what role each controller 140 should serve in the simulation (i.e., whether each controller 140 should act as an attacker or a target).

The simulation data manager 116 can manage simulations executed by the controllers 140 in a variety of ways. In some implementations, the simulation data manager 116 can communicate directly with each of the two controllers 140 that are to be involved in a simulation (i.e., a first controller 140 that will act as an attacker, and a second controller 140 that will act as a target). In such implementations, the simulation data manager 116 can send simulation data directly to both of the first and second controllers 140. The simulation data sent to the controllers 140 can include any of the data discussed above, including information corresponding to the requests that each controller 140 should send and metadata corresponding to the responses that each controller 140 should expect to receive. For example, the simulation data can include configuration information identifying one or more known bad destinations, such as a list of websites that are prohibited from being accessed by any computing device inside the enterprise network 105. In some implementations, such configuration data may be referred to as a "blacklist." In some implementations, the simulation data can include data instructing a controller 140 in the enterprise network 105 to attempt to send one or more data packets to the known bad destination 190, which may have an address corresponding to one of the blacklisted known bad destinations. Thus, in such a simulation, the designated source may be one or more of the controllers 140 inside the enterprise network 105, and the designated destination may be the known bad destination 190 rather than one of the controllers 140. However, as described above, the enterprise network 105 can be configured to prevent packets from actually being delivered to the known bad destination 190 during such a simulation.

In response to sending the management data, the simulation data manager 116 can receive an acknowledgement from each of the controllers 140 indicating that they have received the management data and are ready to begin executing the simulation. The simulation data manager 116 can then send additional management data to the first controller 140 (i.e., the attacker) instructing the first controller 140 to begin the simulation. In some implementations, the simulation data manager 116 can continue to send and receive information to and from any of the controllers 140 used in the attack simulation. For example, the simulation data manager 116 may send status requests to each of the controllers 140 to determine whether the simulation has completed. After the simulation data manager 116 receives responses from the controllers 140 indicating that the simulation has completed, the simulation data manager 116 can receive information corresponding to the results of the simulation from each of the controllers 140. In some implementations, the simulation data manager 116 can be configured to "pull" the result information from the controllers 140 by explicitly requesting that the controllers 140 send the result information. In some other implementations, the controllers 140 can be configured to "push" their respective result data to the simulation data manager 116 of the planner 115, and the simulation data manager 116 can receive the result information from each of the controllers 140 without first requesting the result information.

In some implementations, the simulation data manager 116 may interact with only one of the controllers 140 involved in a simulation. For example, all of the data for the simulation, including the data that a second controller 140 will require in order to execute the simulation, can be sent by the simulation data manager 116 to the first controller 140. The first controller 140 can then send management data to the second controller 140, and the simulation can be executed. After the simulation is complete, the second controller 140 can send its result data directly to the first controller 140 instead of to the simulation data manager 116. The simulation data manager 116 can then receive the aggregated simulation results from both controllers 140 from the first controller 140.

The result data analyzer 117 can be configured to generate information related to the results of one or more simulations. In some implementations, the information generated by the result data analyzer 117 can be based on information received from the controller 140 and from the STEM device 160. For example, the result data analyzer 117 can be configured to query the SIEM device 160 for information related to security events that may have occurred in the enterprise network 105 during a simulation. As discussed above, the SIEM device 160 can be configured to receive such information from the various security mechanisms in the enterprise network 105, including the security control device 145. All of the information received by the SIEM device 160 can be sent to the result data analyzer 117 of the planner 115. In some implementations, the database 118 may contain instructions to be used by the result data analyzer 117 for querying the STEM device 160. For example, the STEM device 160 may be a commercial product developed by a third party. The database 118 can contain application programming interfaces (APIs) associated with various third party STEM devices 160, and the result data analyzer 117 can be configured to retrieve the appropriate API from the database 118 and use the API to send and receive information with the STEM device 160.

In some implementations, the result data analyzer 117 also can receive information from each of the controllers 140 after a simulation has completed. For example, the result data analyzer 117 can receive metadata generated by the controllers 140 during execution of a simulation. Such metadata may include the start time and end time for the simulation, the sockets and ports used during the simulation, and an indication of whether each controller 140 received the expected responses from other controllers 140 during the simulation.

In some implementations, the result data analyzer 117 can validate whether or not the security control device 145 applied security controls on the data packets involved in an attack simulation. For example, the result data analyzer 117 can correlate the information received from the STEM device 160 with the information received from the controllers 140. For example, the result data analyzer 117 can determine that the metadata received from one of the controllers 140 indicates that it did not receive a response that it expected during a simulation. The result data analyzer 117 can then examine the data received from the SIEM device 160 to determine why the expected response was not received. For example, the result data analyzer 117 may determine based on the data received from the STEM device that the expected response was not received because the packets corresponding to the expected response were blocked by the security control device 145. In some implementations, the result data analyzer 117 also can be configured to produce graphical output corresponding to the result data, which may be provided to an administrator.

Figure 1C:
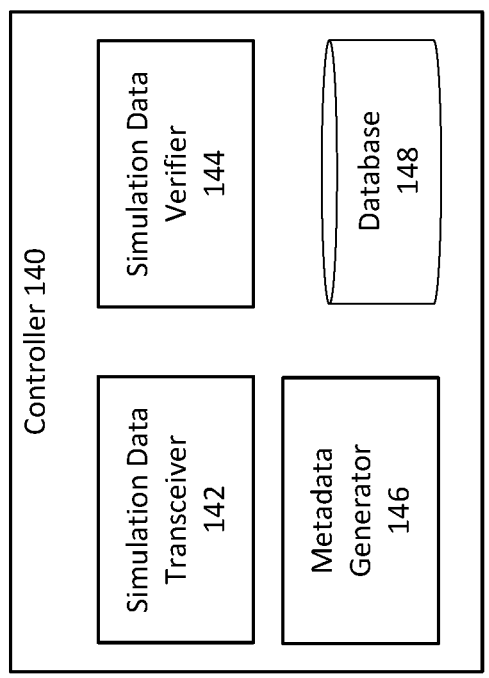
FIG. 1C shows a block diagram of an example controller included in the system network of FIG. 1A.

FIG. 1C shows a block diagram of an example controller 140 included in the system of FIG. 1A. The controller 140 can include a simulation data transceiver 142, a simulation data verifier 144, a metadata generator 146, and a database 148. As discussed above, the controller 140 can execute simulated attacks and other malicious behaviors directly within the enterprise network 105. In some implementations, the controller 140 can be located outside of the enterprise network 105. For example, a controller 140 such as the controller 140e can be located remote from the enterprise network 105. The enterprise network 105 may include several instances of the controller 140 (e.g., at least one instance of the controller 140 in each zone of the enterprise network 105), and all of the controllers 140 may have a structure similar to that shown in FIG. 1C.

In general, the controller 140 can be a self-contained device or software application that remains separate from the production equipment used in the enterprise network 105. This configuration can help to improve the security of the enterprise network 105, because the controllers 140, which execute simulated attacks and therefore may be associated with malicious network traffic, do not have to be relied upon to also serve as production equipment. Thus, no production equipment within the enterprise network 105 is put at risk. In some implementations, the controller 140 can be implemented as a virtual machine (VM). For example, the controller 140 can be a security hardened VM that executes on a computing device within the enterprise network 105. In other implementations, the controller 140 can be a physical computing device. Whether implemented as a VM or a physical computing device, the controller 140 can include or can execute an operating system selected to emulate a particular type of computing device for simulations. For example, the controller 140 may execute a Windows operating system, a Mac OS X operating system or any other operating system corresponding to a device that is to be emulated.

In some implementations, the operating system of the controller 140 can be independent of the type of computing device and/or attack simulation or behavior to be emulated. For example, the controller 140 may run a Linux operating system, but still may emulate a Windows computing device during a simulation by sending data packets that are formatted as if they originated from a device executing a Windows operating system. So regardless of the type of operating system being deployed or used for the VM, the controller may be designed, constructed, or implemented to simulate an attack and/or behavior of an operating system other than or different from the operating system of the VM. For example, the VM may comprise a Linux operating system, but the controller may be implemented to carry out an attack simulation for a MAC OS attack.

In some implementations, the controller 140 can maintain a relatively aggressive security profile. For example, in some implementations, the controller 140 can be configured to refuse connections from all other computing devices at all times except when the controller 140 is executing a simulation. In some other implementations, the controller 140 can be configured to communicate only with a limited number of other computing devices, such as the planner 115. Limiting the number of computing devices in this way can help to prevent an outside attacker from accessing the controller 140 without authorization. In some implementations, during the execution of a simulation, the controller 140 can be configured to communicate only with other controllers 140 within the enterprise network 105, such that the controller 140 is unable to communicate with production computing devices in the enterprise network. Such a configuration can prevent the production computing devices from accidentally receiving malicious network traffic that may be transmitted between controllers as part of a simulation. In some other implementations, the controller 140 can be configured to attempt to communicate with a known bad destination such as the known bad destination 190. In such an example, other devices in the enterprise network 105, such as the network device 150 and the egress point 155, can be configured to prevent network traffic from actually reaching the known bad destination 190. For example, the network device 150 and/or the egress point 155 can be configured to implement a proxy rule or a NAT rule to ensure that network packets sent by a controller 140 inside the enterprise network 105 as part of a simulated attack involving the known bad destination 190 are instead routed elsewhere, for example to the controller 140e in the cloud network 110.

The simulation data transceiver 142 can be configured to transmit and receive data related to the execution of simulations. For example, the simulation data transceiver 142 can receive simulation management data from the planner 115. As discussed above, simulation management data can include instructions for executing various simulations, such as information relating to the network traffic that should be transmitted by the controller 140 during a simulation, the destination to which the network traffic should be sent, and the types of responses that should be expected. In some implementations, the simulation data transceiver 142 can be configured to "pull" such management data from the planner 115, and to drop packets that are "pushed" to the simulation data transceiver 142. That is, the simulation data transceiver 142 may be configured to request such management data from the planner 115, and to refuse any data that purports to come from the planner 115 unless the data is sent in response to a request. This configuration can help to prevent attacks from devices that may attempt to attack the controller 140 by impersonating the planner 115. In some other implementations, the simulation data transceiver 142 can be configured to receive management data that is pushed from the planner 115.

The simulation data transceiver 142 also can be configured to send and receive network traffic to and from other controllers 140 in the enterprise network 105. For example, during a simulation, the simulation data transceiver 142 can connect to other controllers 140 to simulate an attack. In some implementations, the simulation data transceiver 142 can open a connection to another controller 140 via routing and switching devices such as the security control device 145. In some implementations, the simulation data transceiver 142 can maintain a stateful connection with such devices, in the same manner as would be done by another computing device in the same network zone. The simulation data transceiver 142 can send simulation data using any type of protocol, including TCP or other protocols that require a stateful connection. In some implementations, information corresponding to the data to be sent during a simulation can be stored in the database 148, and the simulation data transceiver 142 can retrieve that data from the database 148. The simulation data transceiver 142 also can be configured to receive network traffic from another controller 140 during a simulation. For example, the simulation data transceiver 142 can receive responses from another controller 140 after sending a request to the other controller 140.

As discussed above, simulation data can be extracted or generated based on a PCAP file representing a conversation between two host devices. In some implementations, the simulation data transceiver 142 can be configured to send simulation data to a second controller 140 based on the applications involved in the original conversation. For example, the operating system of the controller 140 can include an implementation of a TCP/IP stack, and the simulation data transceiver 142 can make use of this stack when executing a simulation whose original conversation was conducted using an application that requires TCP communication. The simulation data transceiver 142 also may have additional functionality to increase the realism of simulation data and to assist with transmitting simulation data to a second controller 140 through the complex topology of the enterprise network. For example, the simulation data transceiver 142 may support NAT and proxies with and without authentication, such as Basic, Radius, NTLM, and Kerberos. Thus, before a message is sent by the simulation data transceiver 142, the simulation data transceiver 142 can be configured to adjust the message as needed based on the topology of the enterprise network. For example, the simulation data transceiver 142 may add Kerberos service ticket information for proxy authentication into an HTTP packet header, if such information is required by the enterprise network.

In some implementations, the simulation data transceiver 142 can be configured to open an encrypted channel between the controller 140 and another controller 140 when running a simulated attack. An encrypted channel for attack simulations can better simulate a real attack within the enterprise network 105, because some attacks rely on using encrypted network traffic to avoid being detected or blocked by security mechanisms. Thus, by sending encrypted network traffic during an attack, the security mechanisms in the enterprise network can be more thoroughly tested. In some implementations, if the security mechanisms, such as the security control device 145, are not decrypting and inspecting encrypted network traffic, an attack may be successfully carried out in the enterprise network. For example, certain security mechanisms may be configured to act as a secure socket layer (SSL) man-in-the-middle proxy to decrypt network traffic and direct the decrypted network traffic through an IPS or IDS. By using encrypted traffic for some attack simulations, this functionality can be tested and an administrator can be notified if the encrypted attack simulation goes undetected, so that the problem can be corrected. In some implementations, the simulation data transceiver 142 also can be configured to establish a second channel between the controller 140 and the other controller 140 that is participating in a simulation. The second channel can be used to send management data, which may include commands and configuration information that is separate from the actual simulated attack data. Separating the management data from the attack data can provide a more realistic attack simulation, because the encrypted first channel is used only for attack data, as would occur during an actual attack.

The simulation data verifier 144 can be configured to determine whether the network traffic received from another controller 140 during a simulation corresponds to the expected responses. In some implementations, the database 148 can store information corresponding to the responses that are expected to be received during a simulation. The simulation data verifier 144 can retrieve this information from the database 148 and, as network traffic is received from another controller 140 during a simulation, the simulation data verifier 144 can compare the received data to the expected data. As discussed above, the application associated with a particular simulation can impact the expected responses for the simulation, as the higher level application data is more important than the lower level packet data. For example, for an HTTP simulation, the simulation data verifier 144 can be configured to ignore the information contained in packet headers and instead may only examiner the body of response packets, because the packet headers may be altered in various ways by intermediary devices in the enterprise network. The metadata generator 146 can receive the results of the comparisons performed by the simulation data verifier 144, and can produce metadata based on the results. For example, in some implementations, the metadata generator 146 can generate a flag indicating a mismatch for each instance of network traffic received from another controller 140 that does not match the data that was expected to be received. The simulation data transceiver 142 can send the metadata produced by the metadata generator 146 to the planner 115 after the simulation has been completed, so that the planner 115 can use the metadata to analyze the results of the simulation as discussed above.

Figure 2:
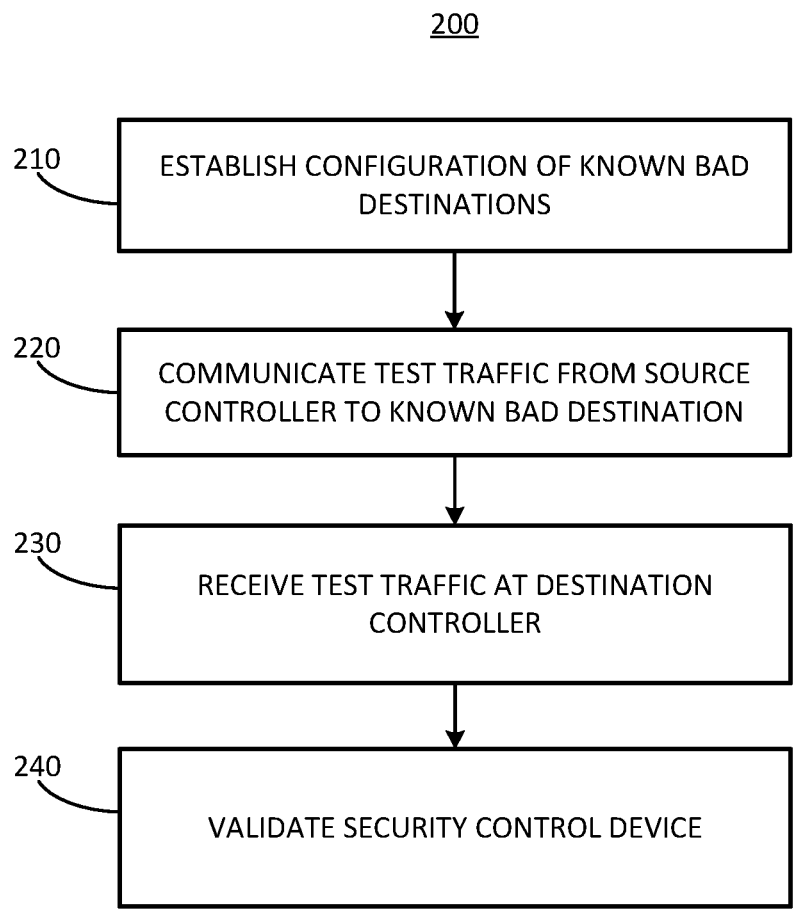
FIG. 2 is a flowchart of an example method of testing known bad destinations while in a production network.

FIG. 2 is a flowchart of an example method 200 of testing known bad destinations while in a production network. In brief overview, the method 200 includes establishing a configuration of known bad destinations in a production network (step 210), communicating test traffic from a source controller to the known bad destination (step 220), receiving the test traffic at a destination controller (step 230), and validating a security control device (step 240).

Referring again to FIG. 2, and in greater detail, the method 200 includes establishing a configuration of known bad destinations in a production network (step 210). In some implementations, the configuration can be established for at least a source controller and a destination controller, each of which may correspond to one of the controllers 140 shown in FIG. 1A. In some implementations, the source controller can be positioned within a selected zone of an enterprise network, such as the enterprise network 105 shown in FIG. 1A, and the destination controller can be positioned outside of the enterprise network, such as in the external cloud network 110 shown in FIG. 1A. In some implementations, the establishment of the configuration of the known bad destinations can be performed by a planner, such as the planner 115 of FIG. 1A. The planner also can be located either within the enterprise network, or can be outside of the enterprise network in a remote cloud network.

In some implementations, a known bad destination can be any computing device that a network administrator wishes to prevent communications with from inside the production network. A known bad destination can be located within the production network, or may be external to the production network. A known bad destination can be identified based on an IP address, a domain name or FQDN of a website, a MAC address, or any other identifying information. In some implementations, a known bad destination can be any destination within a particular subnetwork or top-level domain. In some other implementations, a known bad destination can refer to a single computing device, or to a subset of ports including a single port on a computing device.

The method 200 can include communicating test traffic from a source controller to the known bad destination (step 220). In some implementations, the test traffic can be generated by the source controller. The source controller can generate the test traffic, for example, based on instructions or other simulation data received from the planner. In some implementations, the simulation data can include information such as a sequence of two or more network packets that should be sent from the source controller to the known bad destination during the simulation, as well as metadata or any other data associated with the packets that can facilitate execution of the test. The source controller can parse the simulation data to determine the content of the test traffic (e.g., data to be included in the body of one or more data packets) as well a destination address for the test traffic (e.g., an address of the known bad destination).

The source controller can generate the test traffic with a network identifier corresponding to the address of the known bad destination, and can send the test traffic through the production network, either directly or indirectly through a security control device that is intermediary to the source controller and the destination controller. The test traffic can be indistinguishable from actual malicious data that would be sent during an attack or other attempt to access the known bad destination. In some implementations, the security control device can be configured to apply one or more security controls on the test traffic. For example, the security control device can be configured to drop some or all of the data packets included in the test traffic, based on a determination that their destination address corresponds to the known bad destination. The security control device can also be configured to record and/or report an event corresponding to the attempt by the source controller to contact the known bad destination.

The method 200 also includes receiving the test traffic at a destination controller (step 230). In some implementations, the test traffic can be sent delivered to the destination controller rather than to the bad destination based on a configuration of one or more network devices included in the production network. For example, the network devices can include one or more devices configured to implement a rule based on a source address of data packets. In some implementations, a network device can be configured with a proxy rule that automatically forwards traffic received from the source controller to the destination controller, regardless of the destination address specified by the traffic. The network device can therefore examine the test traffic to determine that it originated from the source controller (e.g., based on a source address of the test traffic), and the proxy rule can cause the network device to automatically forward the test traffic to the destination controller.

In some other implementations, the network device can be configured with a NAT rule that automatically translates a destination address of any packet received from the source controller to an address of the destination controller. Thus, the network device can examine the test traffic to determine that it originated from the source controller (e.g., based on a source address of the test traffic), and the NAT rule can cause the network device to translate the destination address to the address of the destination controller, so that the test traffic is forwarded to the destination controller rather than to the known bad destination. In some implementations, the destination controller can be configured to test the proxy rule or the NAT rule before the source controller attempts to send the test traffic to the known bad destination.

The method 200 also can include validating the security control device (step 240). In some implementations, validation can include determining whether the security device correctly applied the one or more security controls on the test traffic. For example, the security controls can be selected or configured to cause the security control device to modify the test traffic in a predetermined manner, such as by modifying the content of the body of one or more data packets. Thus, the actual test traffic can be compared to expected test traffic to validate whether the security control device correctly applied the one or more security controls. In some implementations, the security controls can be selected or configured to cause the security control device to discard or drop one or more of the packets based on a determination that the packets have a destination address corresponding to the known bad destination. Thus, validation of the security control device can include determining that the destination controller did not receive one or more of the data packets included in the test traffic as a result of the one or more data packets being discarded or dropped by the security control device.

Figure 3A:
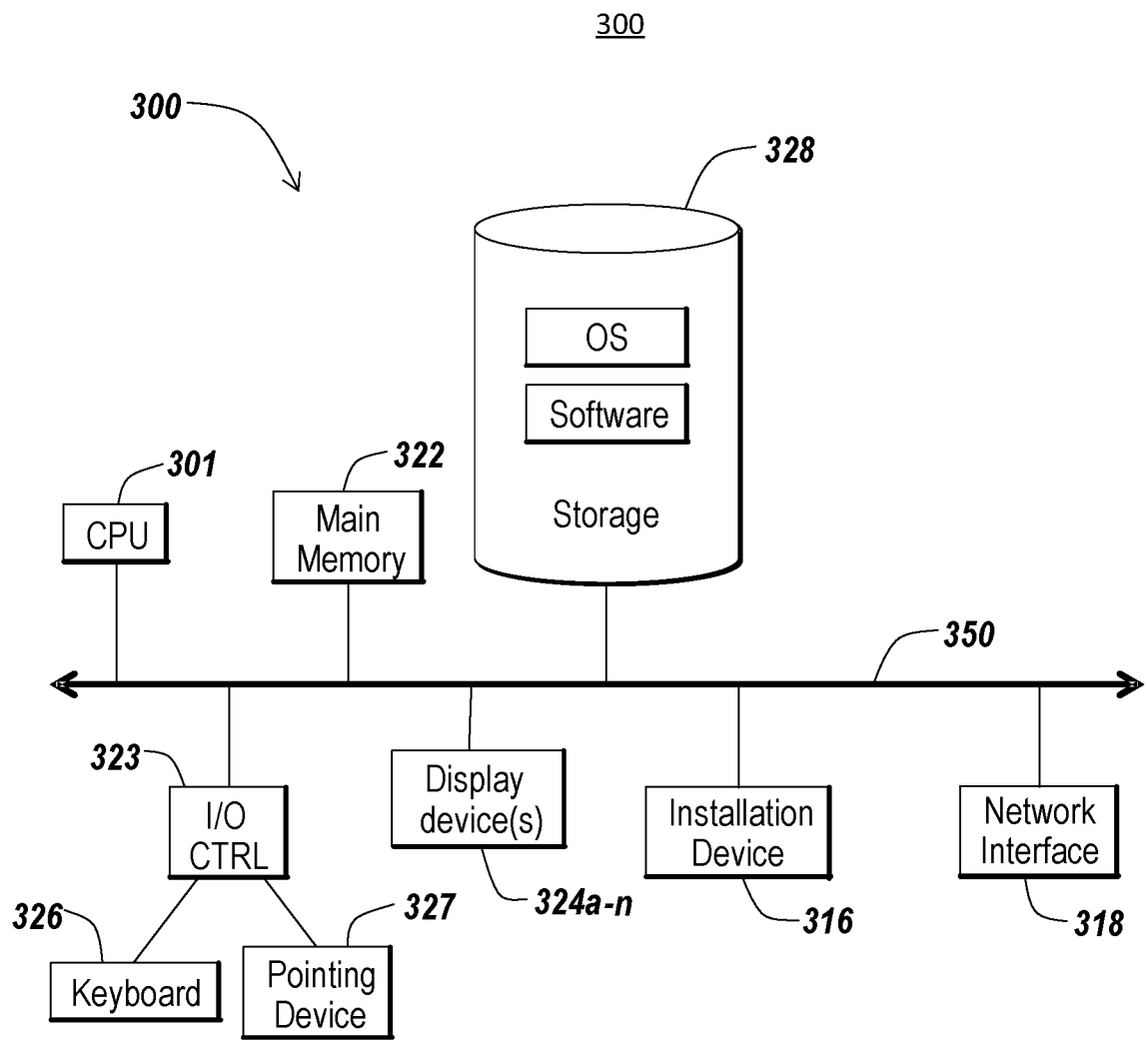
FIGS. 3A and 3B are block diagrams of implementations of an example computing device.
Figure 3B:
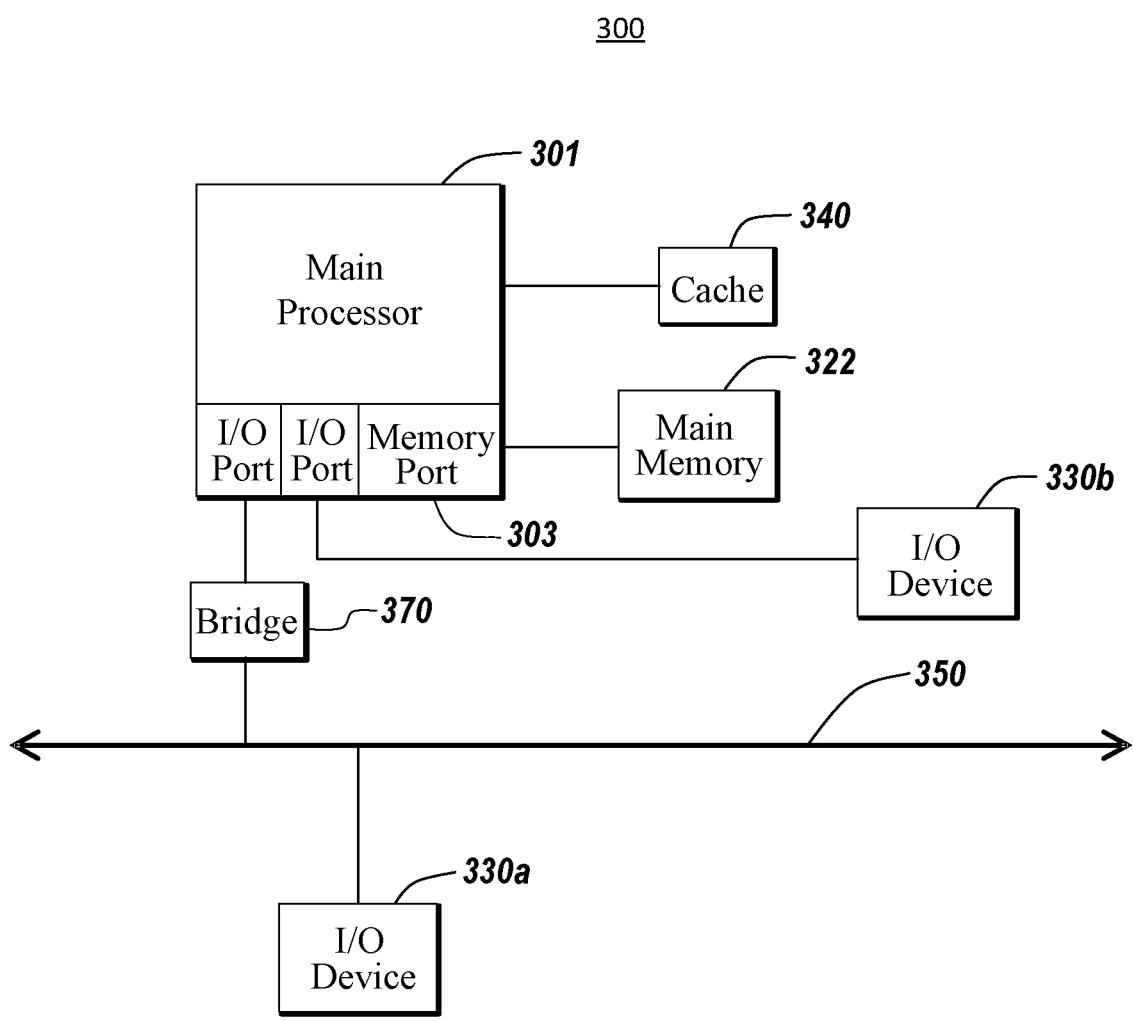

FIGS. 3A and 3B are block diagrams of implementations of an example computing device 300. In some implementations, the computing device 300 may be useful for implementing the planner 115 or the controller 140 shown in FIGS. 1A-1C. As shown in FIGS. 3A and 3B, each computing device 300 includes a central processing unit 301, and a main memory unit 322. As shown in FIG. 1E, a computing device 300 may include a visual display device 324, a keyboard 326 and/or a pointing device 327, such as a mouse. Each computing device 300 may also include additional optional elements, such as one or more input/output devices 330a-330b (generally referred to using reference numeral 330), and a cache memory 340 in communication with the central processing unit 301.

The central processing unit 301 is any logic circuitry that responds to and processes instructions fetched from the main memory unit 322. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 300 may be based on any of these processors, or any other processor capable of operating as described herein.

Main memory unit 322 may be one or more memory chips capable of storing data and allowing any storage location to be directly accessed by the central processing unit 301, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 322 may be based on any of the above described memory chips, or any other available memory chips capable of operating as described herein. In the embodiment shown in FIG. 3A, the central processing unit 301 communicates with main memory 322 via a system bus 350 (described in more detail below). FIG. 3B depicts an embodiment of a computing device 300 in which the processor communicates directly with main memory 322 via a memory port 303. For example, in FIG. 3B the main memory 322 may be DRDRAM.

FIG. 3B depicts an embodiment in which the central processing unit 301 communicates directly with cache memory 340 via a secondary bus, sometimes referred to as a backside bus. In other embodiments, the central processing unit 301 communicates with cache memory 340 using the system bus 350. Cache memory 340 typically has a faster response time than main memory 322 and is typically provided by SRAM, BSRAM, or EDRAM. In the embodiment shown in FIG. 3B, the central processing unit 301 communicates with various I/O devices 330 via a local system bus 350. Various busses may be used to connect the central processing unit 301 to any of the I/O devices 330, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 324, the central processing unit 301 may use an Advanced Graphics Port (AGP) to communicate with the display 324. FIG. 3B depicts an embodiment of a computer 300 in which the central processing unit 301 communicates directly with I/O device 330b via HyperTransport, Rapid I/O, or InfiniBand. FIG. 3B also depicts an embodiment in which local busses and direct communication are mixed: the central processing unit 301 communicates with I/O device 330b using a local interconnect bus while communicating with I/O device 330a directly.

The computing device 300 may support any suitable installation device 316, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any program related to the planner 115 or the controller 140. The computing device 300 may further comprise a storage device 328, such as one or more hard disk drives or redundant arrays of independent disks, for storing an operating system and other related software, and for storing application software programs such as any program related to either the planner 115 or the controller 140. Optionally, any of the installation devices 316 could also be used as the storage device 328. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 300 may include a network interface 318 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 318 may comprise a built-in network adapter, network interface card, PCMCIA network card, card bus network adapter, wireless network adapter, USB network adapter, modem or any other device suitable for interfacing the computing device 300 to any type of network capable of communication and performing the operations described herein.

A wide variety of I/O devices 330a-330n may be present in the computing device 300. Input devices include keyboards, mice, trackpads, trackballs, microphones, and drawing tablets. Output devices include video displays, speakers, inkjet printers, laser printers, and dye-sublimation printers. The I/O devices 330 may be controlled by an I/O controller 323 as shown in FIG. 3A. The I/O controller may control one or more I/O devices such as a keyboard 326 and a pointing device 327, e.g., a mouse or optical pen. Furthermore, an I/O device may also provide storage 328 and/or an installation medium 316 for the computing device 300. In still other embodiments, the computing device 300 may provide USB connections to receive handheld USB storage devices such as the USB Flash Drive line of devices manufactured by Twintech Industry, Inc. of Los Alamitos, Calif.

In some embodiments, the computing device 300 may comprise or be connected to multiple display devices 324a-324n, which each may be of the same or different type and/or form. As such, any of the I/O devices 330a-330n and/or the I/O controller 323 may comprise any type and/or form of suitable hardware, software, or combination of hardware and software to support, enable or provide for the connection and use of multiple display devices 324a-324n by the computing device 300. For example, the computing device 300 may include any type and/or form of video adapter, video card, driver, and/or library to interface, communicate, connect or otherwise use the display devices 324a-324n. In one embodiment, a video adapter may comprise multiple connectors to interface to multiple display devices 324a-324n. In other embodiments, the computing device 300 may include multiple video adapters, with each video adapter connected to one or more of the display devices 324a-324n. In some embodiments, any portion of the operating system of the computing device 300 may be configured for using multiple displays 324a-324n. In other embodiments, one or more of the display devices 324a-324n may be provided by one or more other computing devices, such as computing devices 300a and 300b connected to the computing device 300, for example, via a network. These embodiments may include any type of software designed and constructed to use another computer's display device as a second display device 324a for the computing device 300. One ordinarily skilled in the art will recognize and appreciate the various ways and embodiments that a computing device 300 may be configured to have multiple display devices 324a-324n.

In further embodiments, an I/O device 330 may be a bridge 370 between the system bus 350 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 300 of the sort depicted in FIGS. 3A and 3B typically operate under the control of operating systems, which control scheduling of tasks and access to system resources. The computing device 300 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a UNIX operating system, among others.

In other embodiments, the computing device 300 may have different processors, operating systems, and input devices consistent with the device. For example, in one embodiment the computer 300 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 300 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed is:

1. A method of testing known bad destinations while in a production network, the method comprising:
    (a) establishing, for a source controller and a destination controller in a production network, a configuration of a predetermined set of one or more known bad external destinations to test a security control device of the production network intermediary to the source controller and the destination controller;
    (b) communicating, by the source controller, test traffic generated by the source controller directed to a known bad external destination of the one or more known bad external destinations, the test traffic passing through the security control device with a network identifier of the known bad external destination; and
    (c) receiving, by the destination controller, the test traffic forwarded by one or more processors of a network device of the production network, the network device is an external intermediary to the security control device and the one or more known bad external destinations, the one or more processors of the network device configured to receive the test traffic from the security control device and to change a destination network identifier of the test traffic from the network identifier of the known bad external destination to a network identifier of the destination controller before the test traffic egresses from the production network, wherein the security control device is validated based at least on identifying whether or not the security control device applied security controls on the test traffic having the network identifier of the known bad external destination.

2. The method of claim 1, wherein the network identifier comprises an internet protocol (IP) address or a domain name.

3. The method of claim 1, wherein the test traffic is not communicated from the production network to the known bad external destination.

4. The method of claim 1, further comprising generating, by the source controller, the test traffic using a source network identifier of the source controller and a destination network identifier of the known bad external destination.

5. The method of claim 1, wherein the network device comprises a proxy device configured with a rule to forward traffic from a network identifier of the source controller to the network identifier of the destination controller.

6. The method of claim 5, wherein the rule is configured to forward traffic to a proxy network identifier and port configured on the destination controller.

7. The method of claim 5, further comprising testing, by the destination controller, configuration of the rule on the production network before an action using a known good destination.

8. The method of claim 1, wherein the network device comprises an egress device configured with a network address translation (NAT) rule to change a destination network identifier of traffic to the network identifier of the destination controller if a source network identifier of the traffic corresponds to the source controller.

9. The method of claim 1, wherein the network device is intermediary to the security control device and the destination controller.

10. The method of claim 1, further comprising obtaining, by the source controller and the destination controller, the predetermined set of one or more known bad external destinations from one of a packet capture (PCAP) source, a user input, or a system.

11. The method of claim 1, wherein the security control device is validated based on identifying that the security control device applied the security controls to the known bad external destination by changing the destination network identifier of the test traffic from the known bad external destination to the network identifier of the destination controller before the test traffic egressed from the production network.

12. A system for testing known bad destinations while in a production network, the system comprising:
    a source controller and a destination controller in a production network, the source controller and the destination controller having a configuration of a predetermined set of one or more known bad external destinations to test a security control device of the production network intermediary to the source controller and the destination controller;
    wherein the source controller is configured to communicate test traffic generated by the source controller directed to a known bad external destination of the one or more known bad external destinations, the test traffic passing through the security control device with a network identifier of the known bad external destination; and
    wherein the destination controller is configured to receive the test traffic forwarded by one or more processors of a network device of the production network, the network device is an external intermediary to the security control device and the one or more known bad external destinations, the one or more processors of the network device configured to receive the test traffic from the security control device and to change a destination network identifier of the test traffic from the network identifier of the known bad external destination to a network identifier of the destination controller before the test traffic egresses from the production network, wherein the security control device is validated based at least on identifying whether or not the security control device applied security controls on the test traffic having the network identifier of the known bad external destination.

13. The system of claim 12, wherein the network identifier comprises an internet protocol (IP) address or a domain name.

14. The system of claim 12, wherein the test traffic is not communicated from the production network to the known bad external destination.

15. The system of claim 12, wherein the source controller generates the test traffic using a source network identifier of the source controller and a destination network identifier of the known bad external destination.

16. The system of claim 12, wherein the network device comprises a proxy device configured with a rule to forward traffic from a network identifier of the source controller to the network identifier of the destination controller.

17. The system of claim 16, wherein the rule is configured to forward traffic to a proxy network identifier and port configured on the destination controller.

18. The system of claim 16, wherein the destination controller is configured to test configuration of the rule on the production network before an action using a known good destination.

19. The system of claim 12, wherein the network device comprises an egress device configured with a network address translation (NAT) rule to change a destination network identifier of traffic to the network identifier of the destination controller if a source network identifier of the traffic corresponds to the source controller.

20. The system of claim 12, wherein the network device is intermediary to the security control device and the destination controller.

21. The system of claim 12, wherein the source controller and the destination controller are configured to obtain the predetermined set of one or more known bad external destinations from one of a packet capture (PCAP) source, or a user input.

22. The system of claim 12, wherein the security control device is validated that the security control device applied the security control to the known bad external destination by changing the destination network identifier of the test traffic from the known bad external destination to the network identifier of the destination controller before the test traffic egressed from the production network.

* * * * *